United States Patent
Tidgwell (10) Patent No.: US 8,564,665 B2
(45) Date of Patent: Oct. 22, 2013

(54) EMERGENCY VEHICLE VIDEO AND LIGHTING SUPPORT

(76) Inventor: James Leonard Tidgwell, Eveleth, MN (US)

(*) Notice: Subject to any disclaimer, the term of this patent is extended or adjusted under 35 U.S.C. 154(b) by 462 days.

(21) Appl. No.: 12/925,781

(22) Filed: Nov. 1, 2010

(65) Prior Publication Data

US 2011/0134244 A1 Jun. 9, 2011

Related U.S. Application Data

(60) Provisional application No. 61/283,451, filed on Dec. 4, 2009.

(51) Int. Cl.
*B60R 1/00* (2006.01)

(52) U.S. Cl.
USPC ................... 348/148; 362/493; 701/1

(58) Field of Classification Search
USPC ........................................... 348/148
See application file for complete search history.

(56) References Cited

U.S. PATENT DOCUMENTS

| 2002/0113876 | A1* | 8/2002 | Kim | 348/148 |
| 2003/0080878 | A1* | 5/2003 | Kirmuss | 340/936 |
| 2005/0243171 | A1* | 11/2005 | Ross et al. | 348/148 |
| 2007/0195939 | A1* | 8/2007 | Sink et al. | 379/37 |

* cited by examiner

*Primary Examiner* — Sath V Perungavoor
*Assistant Examiner* — Howard D Brown, Jr.

(57) ABSTRACT

My idea either adds lights and cameras to existing lights and cameras, or in some cases it adds a whole new system. The idea can be used on any vehicle, but is designed for emergency vehicles in particular. The idea would be very beneficial in dark areas like in the country. The system could be very advantageous at night for accident scenes, crime scenes, etc. I know it will be a great asset.

1 Claim, 8 Drawing Sheets

EMERGENCY VEHICLE VIDEO AND LIGHTING SUPPORT

I claim the benefits of the filing date Dec. 4, 2009 on Provisional Patent Application 61/283,451.

BRIEF DESCRIPTION OF THE DRAWINGS

FIG. A shows drawing of system and components;
FIG. B shows a blow up of Siamese Cable and parts, (M), (N), (O), (P), (Q), (R), and (S);
FIG. C shows Right end;
FIG. D shows Left end;
FIG. E shows Front view;
FIG. F shows Rear view;
FIG. G shows Top view;
FIG. H shows top view and overall purpose and coverage;

HOW IT WORKS

Figure 1:
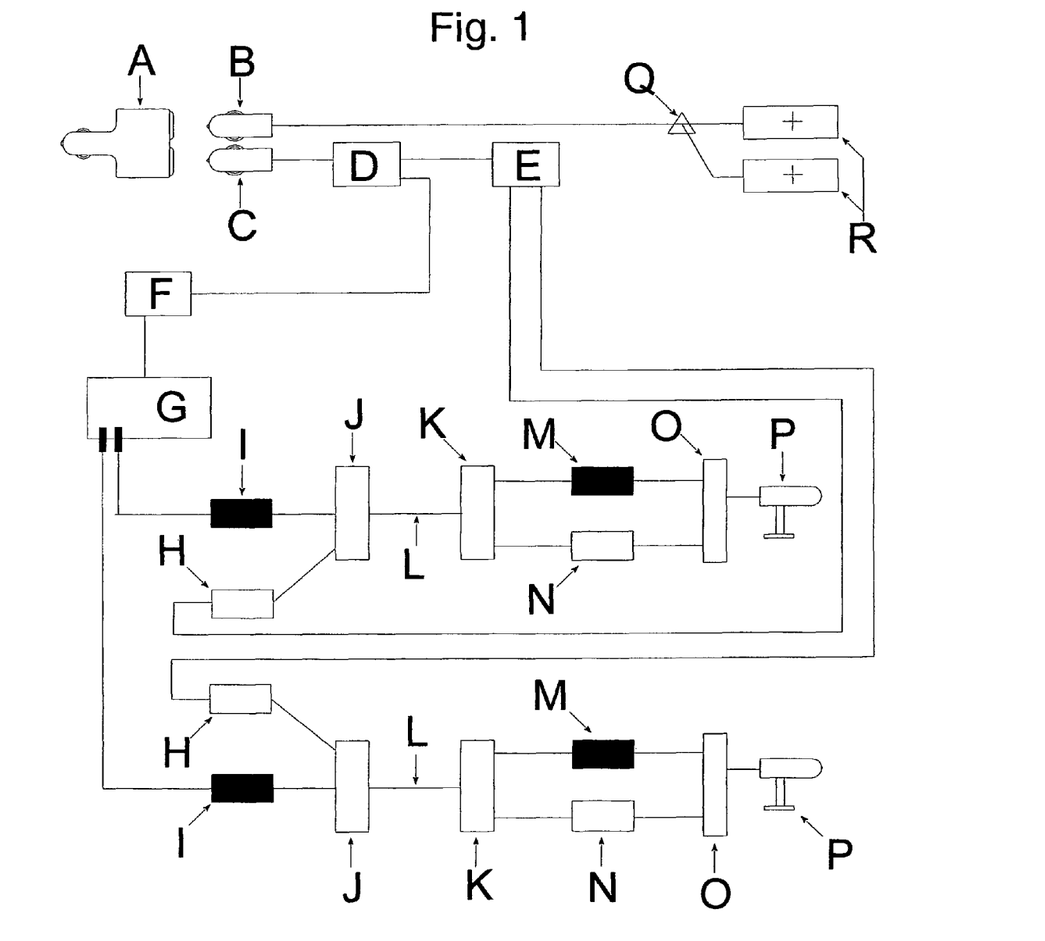
Figure 2:
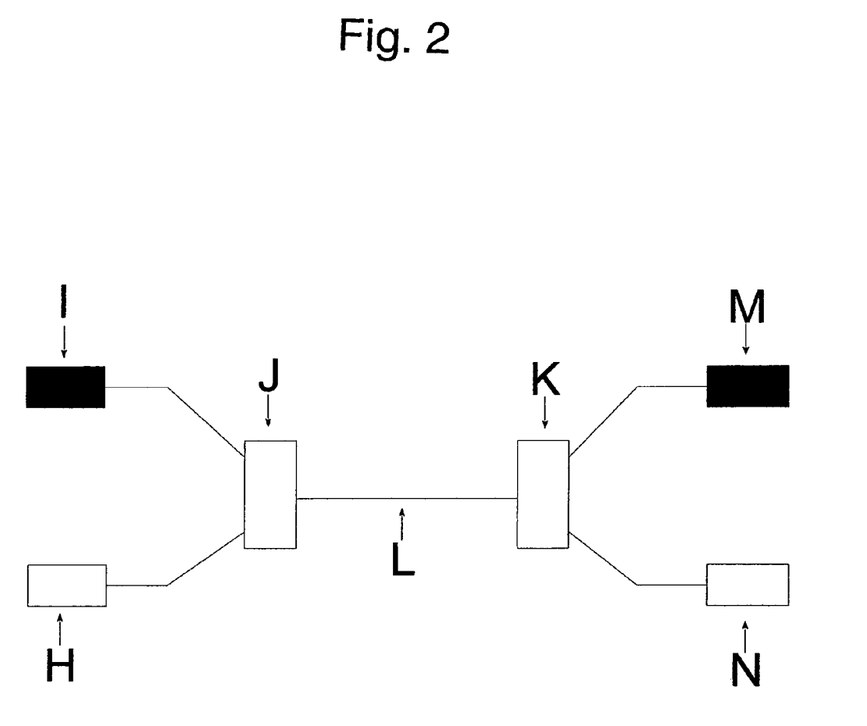
Figure 3:
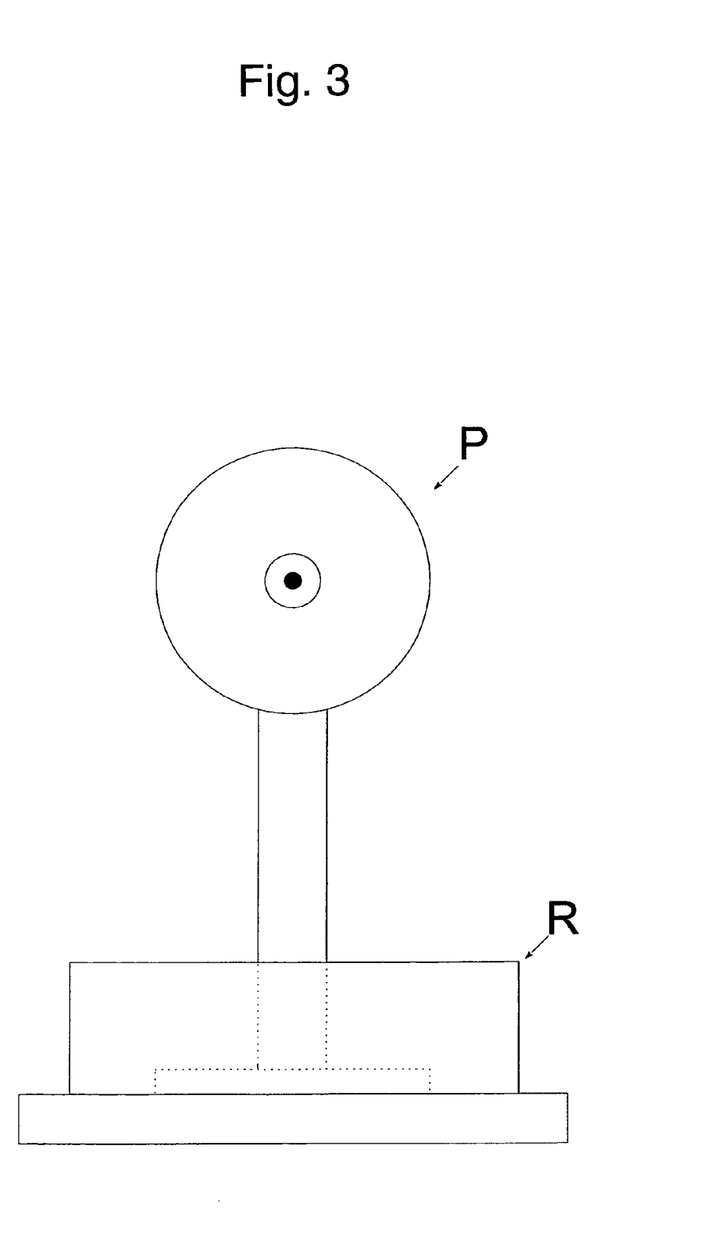
Figure 4:
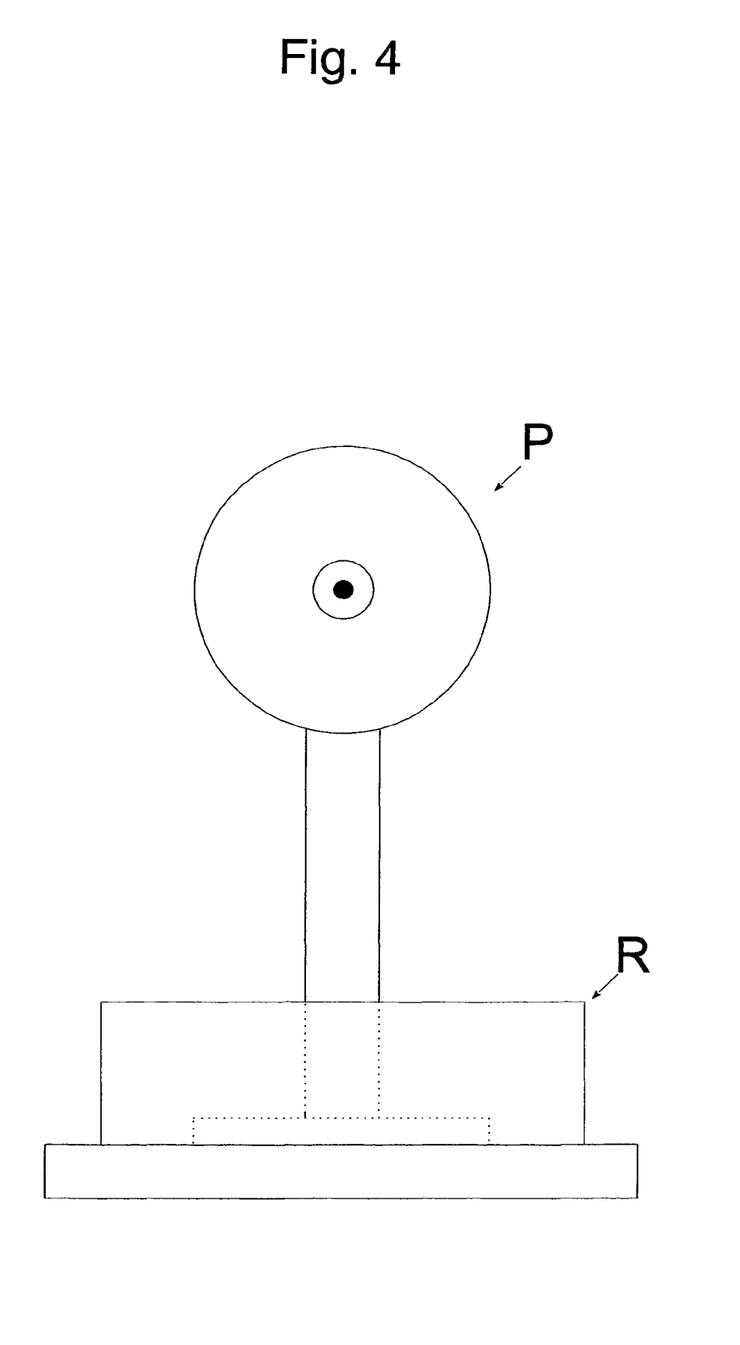
Figure 5:
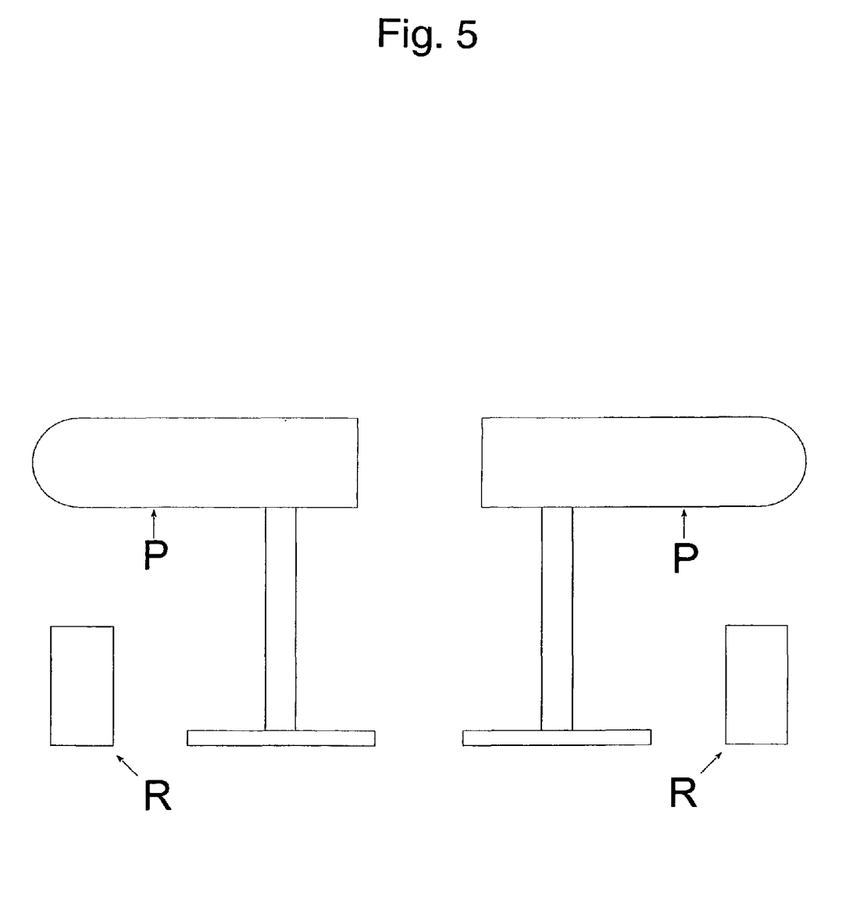
Figure 6:
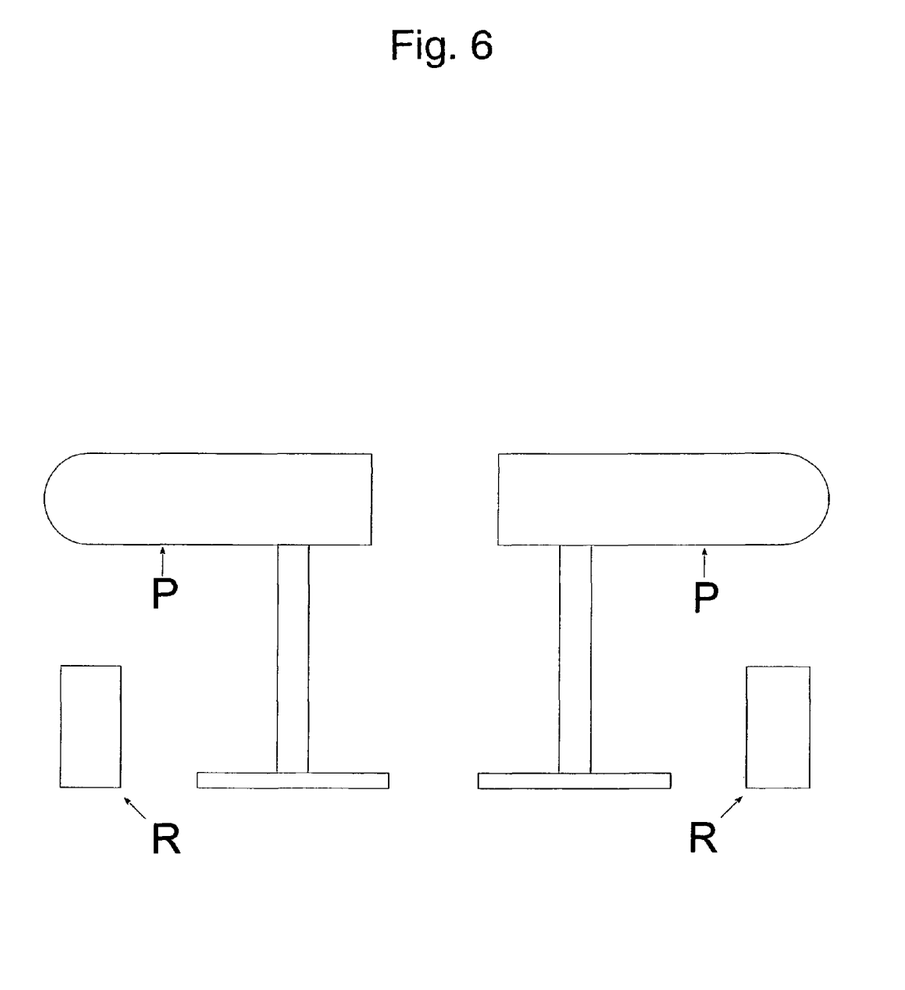
Figure 7:
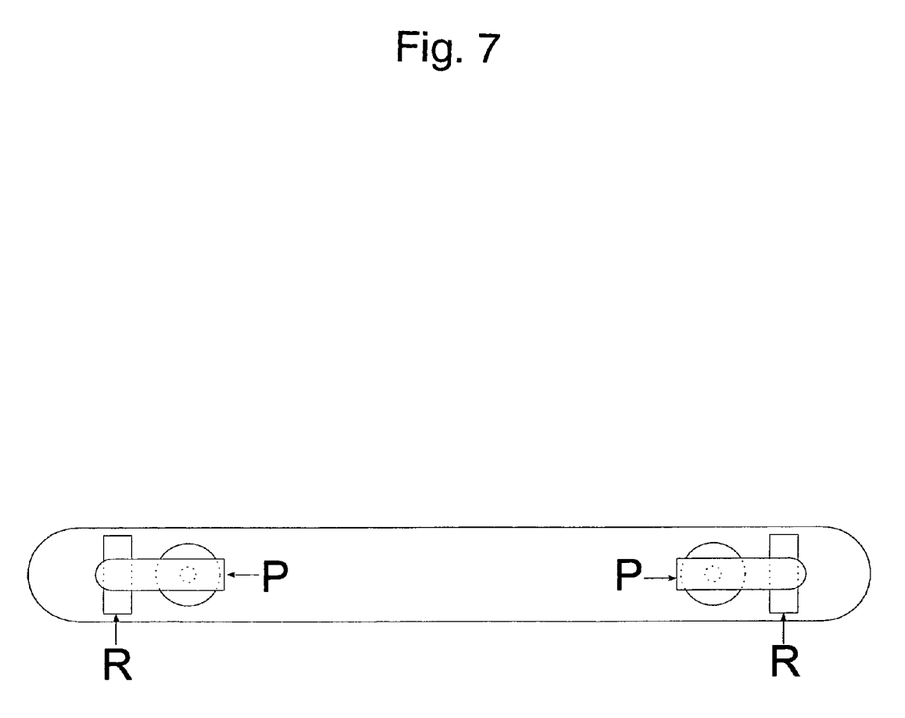
Figure 8:
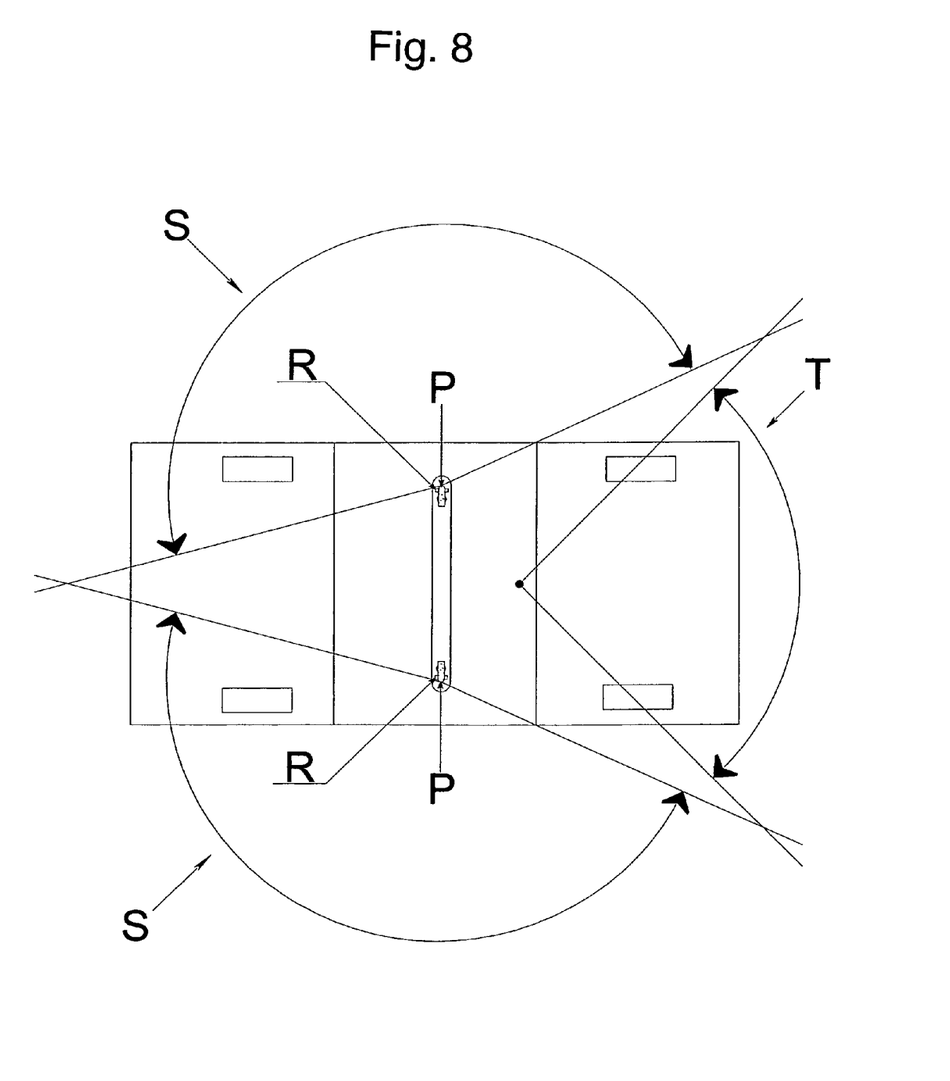

My idea draws its power from the cigarette socket or auxiliary socket. A male plug (A), plugs into the auxiliary socket of the cigarette lighter console, or the cigarette lighter socket itself. The plug (A) has one plug in and two sockets out, (B) and (C). Plug (B) has a wire coming out of it and going directly to the lights (R×2), and spliced together at (Q). Plug (C) has a wire that plugs into (D), which is an inverter, one inlet and two outlets (12v dc to 110v ac). One of the 110v wires goes to (E), a 110V ac to 12V dc converter.

At (E), the wire plugs into a one in and two out splitter. Each of the two wires has an RCA male connector which plugs into a female connector at (H×2) from (L×2), which is the RCA end of the Siamese cable, thru (J×2). The other wire from (D) goes to (F) another 110v ac to 12v dc converter. From (F), a wire plugs into (G), a DVO recorder. Two wires come out of (G) from the BNC hubs. These wires connect a (I×2) which comes out of (J), the BNC end of the Siamese cable from (L). (L) Runs through (K), where it is split into a BNC, and an RCA wire. After the two wires leave (K), one connects at (M×2) which is the BNC side from the camera.

The other one leaves (K), and connects at (N×2) which is the RCA side of the camera. At (O×2), the two wires combine to make one wire which connects to (P×2), the cameras. (S), shows the different arcs of the two auxiliary cameras (P×2). (T), shows the arc of the window, dash camera.

Emergency Vehicle Video and Lighting Support

This idea is more for the concept then the components, and I hope it falls under the heading of intellectual property. My idea has to do with covering the "blind spots" of a standard dash/window camera on police, state trooper, or any other vehicles that use them. My system will add cameras and lights to cover a majority of the blind spots, if not all. It would be run on a separate system from the main video system. It would be activated by two manual switches (optional), one to activate the cameras and one to activate the lights when needed.

The one left camera would intersect the left viewing area of the window~dash camera. The one camera on the right would do the same to the right side. As I said, it is the concept which is important. Mine is but a prototype, and somewhat cumbersome. With the right knowledge and technology, it could be made much less cumbersome, and much more compact. Instead of power coming out of the cigar lighter socket, as in my prototype, it could come from the main circuitry of the wiring harness, or its own separate circuit L.

The cameras could be routed into the main computer and recorded on a hard drive, DVD, DVR, or even a main feed to the station through satellites. The three main components for this idea and any future spinoffs are: extra cameras, extra lights, and a video recording device. The cameras could be smaller, and the lights could have a higher wattage. I have very limited knowledge of anything to do with electricity or electronics, but I know this is a very sound concept. The video part of my idea could be wireless. They can be connected by USB or Ethernet or any plausible, efficient, and inexpensive manner. In colder climates, a small heating element/component could be added.

The lights and cameras have to be in an enclosed area because of weather, debris, or anything else that could damage them. The possibilities for this idea are limitless. The angle (viewing radius) would vary with different cameras, (each on the prototype covers 170 degrees). The amount of lux on each camera would vary on each system, depending on the amount of added light. With the added lighting, it would not only help the camera, but also the naked eye.

My idea could also be applied to any other emergency vehicles. In the case of an ambulance, the added lights would come in very handy for treating injuries. The cameras could verify the type of treatment and possibly deter law suits. On fire trucks it would serve the same purpose as on an ambulance. If a bunch of emergency vehicles were at the same sight, the added lights and video would be a definite attribute, I don't think there are any downsides to my idea.

This Page Shows the Units and their Functions.

Component A shows the cigarette lighter adapter which plugs into the lighter hole or the auxiliary hole on the dash. This is where the power comes from to energize the system. This adapter has one male which plugs into the dash. On the other end of the adapter are two female sockets. Coming out of adapter A are two male cigarette lighter plug-ins, each having a wire coming out of them. These plugins are B and C. The wire from B goes directly to the 12v dc lights. This wire is spliced at V to give power to both lights. The wire from C goes to an inverter D where the 12v dc is changed to 110v ac to power the monitor through wire F. Component D has two wires coming out of it. One of the wires goes to component E which is a converter which changes it back to 12v dc. This wire gives power to the cameras. The cameras in my prototype are 170 degree cameras. The other wire F powers the monitor which lets the person see what the cameras are seeing. The monitor is connected via video cable to G which is the DVR.

Wire E is connected to a splitter which has one wire in and is split into four wires out for use in up to four cameras. Each of these wires is connected to the power side of each Siamese cable. Leaving G are two BNC or video cables which are connected to I, which is the video side of the Siamese cable. One of the wires from E goes to the RCA or power side of the Siamese cable. These two cables join internally at J. After leaving J, the single wire L goes to K where it is split into a power side and a video side. Camera P has one wire coming out. This wire is split at O where it becomes an RCA or power side which is M, and a BNC or video side, which is N. These two wires are connected video to video and power to power. At this point the system is ready for use.

Emergency Vehicle Video and Lighting Support is a method of videotaping and storing events on emergency vehicles or any other vehicles. The system uses added lights and cameras to record events for use on emergency vehicles or any other vehicles. The system needs a power supply which comes directly from the battery or the wiring harness. The system utilizes electrical wiring, electrical cables, audio and video cables, a video monitor, a recording device, an image capturing device, a monitor, voltage inverters, and voltage converters. It can be run totally on a 12v dc system if the monitor is a 12v dc model. The monitor is preinstalled on most squad cars and my idea would be wired into the existing system. The system could be wireless, whereas some of these components could be eliminated.

The video capturing device is usually a camera. These extra lights and cameras will be mounted on the light bar. They will have to be protected from the elements and possibly other objects like tree branches, brush, or any other object that might be contacted if a pursuit goes off road. This could be accomplished by using glass or plastic. The recording device could be a DVD, DVR, or direct satellite feed to a main computer.

I think this idea will be of great benefit to law enforcement in particular and all emergency vehicles in general or any other vehicle. Law enforcement would benefit from my idea. There would be very little or no "blind spots". If there are any questions to an arrest, the procedure would be a record to be utilized as needed. In the case of an ambulance, fire truck, or any other emergency vehicles, the extra lighting would be very beneficial in dark or remote areas.

The recording could be used if there are any discrepancies as far as procedures. The law enforcement agencies I have talked to or shown it to have been very receptive to the idea and have seen no down sides to the concept. I think my idea is very plausible and very usable, and a great benefit to users of emergency vehicles or any other vehicles. One other vehicle of particular interest is School Buses.

EMERGENCY VEHICLE VIDEO AND LIGHTING SUPPORT COMPONENT LIST

A. Male/female cigarette lighter plug. One male end to plug into vehicle and two female socket outlets;
B. Male cigarette lighter plug;
C. Male cigarette lighter plug;
D. 12V dc to 110V ac inverter;
E. 110V ac to 12V dc converter;
F. 110V wire to power monitor;
G. Monitor;
H. Video Cable from monitor to DVR;
I. DVR;
J. 12v dc wire from E;
K. Splice in J to power L;
L. One power wire in and split to four out for up to four cameras;
M. BNC or video connection from 1 and P through O;
N. RCA or power connection from L and P through O;
O. Shows where M and N combine to form a single P;
P. Siamese Cable which is split on each end to form a BNC side and an RCA side;
Q. Shows where P splits to form an RCA and BNC side;
R. BNC connection from P through Q and U through T;
S. RCA connection from P through Q and U through T;
T. Shows where R and S are joined to make a single wire to U or where U from P splits to form a BNC side and an RCA side;
U. Shows the cameras;
V. Shows a splice to power the lights W;
W. Shows the lights;
X. Shows large arc;
Y. Shows arc of dash cam which will vary with angle of camera coverage;

The invention claimed is:

1. An emergency vehicle video and lighting support system comprising:
    a vehicle having a light bar mounted on its roof;
    a light bar having a first side and a second side linearly opposite to the first side;
    a first camera mounted on the dashboard of the vehicle, wherein the first camera has a 170 degree field of view encompassing the vehicle's front side;
    a second camera and a first light source mounted on the first side of the light bar, wherein the second camera has a 170 degree field of view extending from a one side of the vehicle to the vehicle's rear side and partially overlapping with the field of view of the first camera;
    a third camera and a second light source mounted on the second side of the light bar, wherein the third camera has a 170 degree field of view extending from another side of the vehicle to the vehicle's rear side and partially overlapping with the field of view of the first camera;
    a recording device coupled to the second and third cameras to record data captured by the second and third cameras;
    a monitor device coupled to the recording device to display data captured by the second and third cameras; and
    a cigarette lighter adaptor compatible power source for energizing the first camera, the second camera, the third camera, the first light source, the second light source, the recording device, and the monitor.

* * * * *